July 21, 1953  J. A. V. TURCK  2,646,219

KEY-DRIVEN CALCULATING MACHINE

Filed Nov. 22, 1949  7 Sheets-Sheet 1

INVENTOR:
Joseph A. V. Turck
By: Schroeder, Merriam,
Hofgren & Brady
Attorneys

July 21, 1953 — J. A. V. TURCK — 2,646,219
KEY-DRIVEN CALCULATING MACHINE
Filed Nov. 22, 1949 — 7 Sheets-Sheet 2

INVENTOR:
Joseph A. V. Turck
By: Schroeder, Merriam, Hofgren & Brady
Attorneys

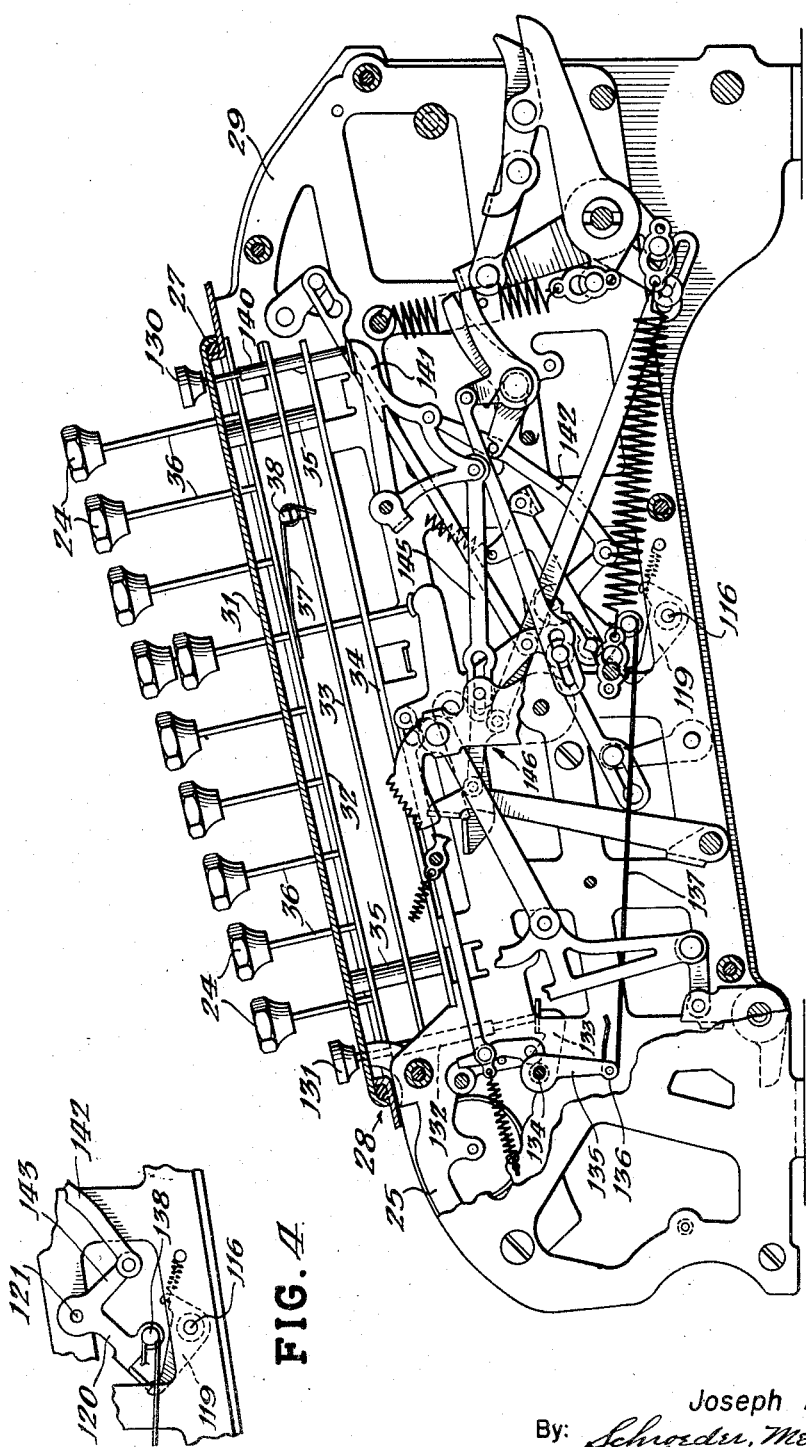

July 21, 1953  J. A. V. TURCK  2,646,219
KEY-DRIVEN CALCULATING MACHINE
Filed Nov. 22, 1949  7 Sheets-Sheet 4

INVENTOR:
Joseph A. V. Turck
By: Schroeder, Merriam, Hofgren & Brady
Attorneys

July 21, 1953  J. A. V. TURCK  2,646,219
KEY-DRIVEN CALCULATING MACHINE
Filed Nov. 22, 1949  7 Sheets-Sheet 5

INVENTOR:
Joseph A. V. Turck
By: Schroeder, Merriam,
Hofgren & Brady
Attorneys

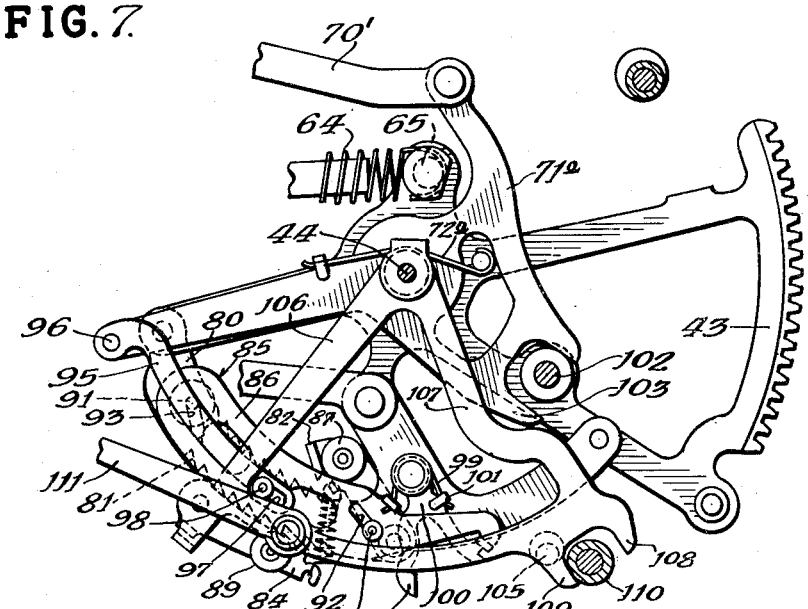
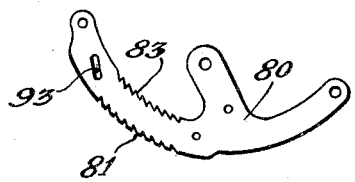
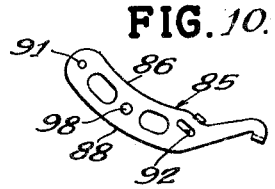
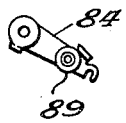
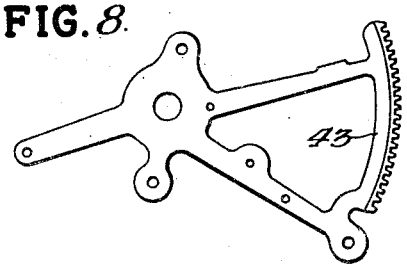
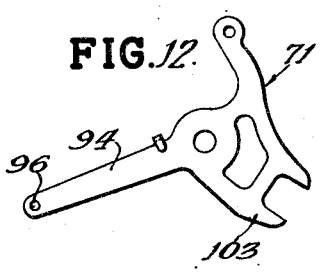
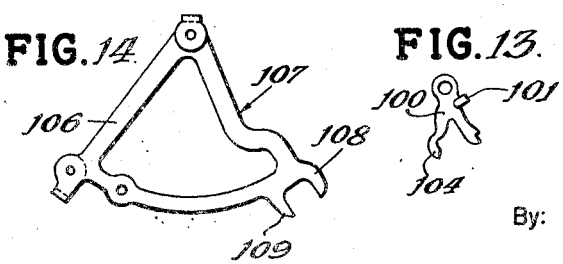

July 21, 1953 J. A. V. TURCK 2,646,219
KEY-DRIVEN CALCULATING MACHINE
Filed Nov. 22, 1949 7 Sheets-Sheet 7

INVENTOR
Joseph A.V. Turck
By Schroeder, Merriam,
Hofgren & Brady
ATTORNEYS

Patented July 21, 1953

2,646,219

UNITED STATES PATENT OFFICE 2,646,219

KEY-DRIVEN CALCULATING MACHINE

Joseph A. Valentine Turck, Miami Beach, Fla., assignor to Felt and Tarrant Manufacturing Company, a corporation of Illinois Application November 22, 1949, Serial No. 128,741

8 Claims. (Cl. 235—82)

This invention relates to improvements in calculating machines, and more particularly to improvements in the key-driven type of calculating machine where additive actuation is created by the down key depression in setting up power in springs to give additive degrees of action on the up or return stroke of the actuating mechanism.

It is the general object of this invention to produce an improved key-driven calculating machine.

It is a more specific object of the invention to provide a more desirable distribution of the manual power required for the actuation of a key-driven calculating machine.

It is the further object of the invention to produce a calculating machine of the type described in the preceding paragraph in which the length of the machine from front to rear is reduced.

It is another object of the invention to produce an error control mechanism including dual ratchet dogs and a shifting guard plate for engaging one or the other dog with the ratchet and adapted to lock the keyboard in the event a key has been incompletely depressed on a preceding stroke and also to prevent the depression of a key when any key on a preceding stroke has become held against a full return.

Another object of the invention is to produce an error control mechanism of the type described in the preceding paragraph and designed for use with the dual digital stop control actuating mechanism disclosed in my pending application Serial No. 696,517, filed on September 12, 1946, now Patent No. 2,547,063.

Another object of the invention is to produce an improved clearing means for the error control mechanism and more specifically to provide digitally actuated clearing means for the error control mechanism so placed on the keyboard of the calculating machine as to be operable by the operator without removal of the fingers from the keys.

Another object of the invention is to produce new and improved control means for the compound lever system disclosed in my said pending application, Serial No. 696,517.

Other and further objects of the invention will become apparent from the following description of the preferred embodiment illustrated in the accompanying drawings, in which:

Fig. 3 is a front to rear sectional view taken at the right hand side of the machine and taken substantially along the line 3—3 of Fig. 1.

Fig. 4 is a detailed view of the catch control for the error control mechanism.

Fig. 7 is an enlarged detailed view of the lower right hand portion of Fig. 2.

Figures 2, 15:
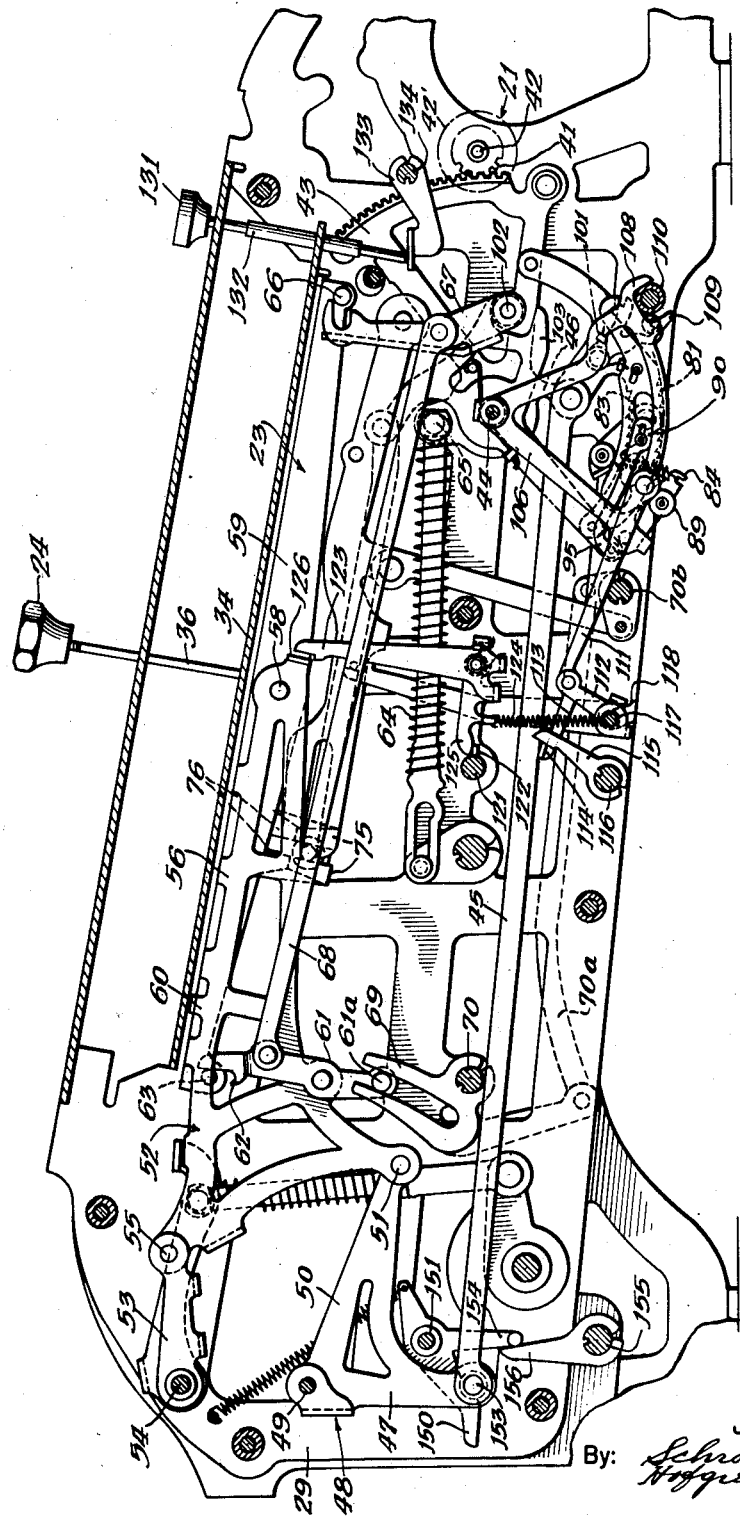
Fig. 2 is a front to rear sectional view taken substantially on the line 2—2 of Fig. 1 and showing details of the actuating mechanism for one of the ordinal columns of keys.
Figure 16:
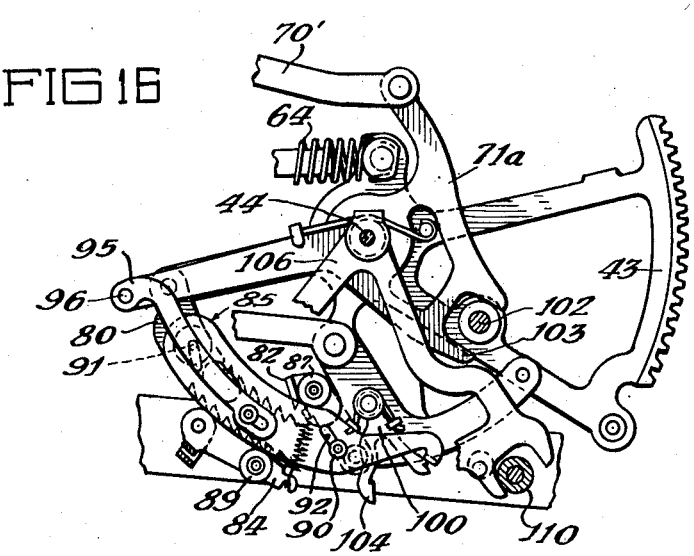
Figure 17:
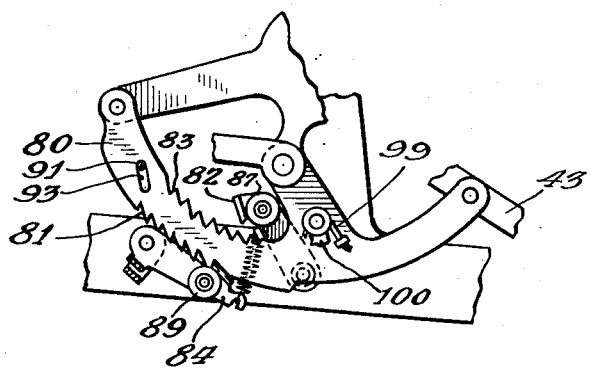

Figs. 8 to 14, inclusive, are detailed views of the individual parts making up the mechanism of Fig. 7;

Fig. 15 is a detailed view of certain parts of the key power control system; and Figs. 16 and 17 are views similar to Fig. 7 with part of the overlying parts broken away in order more clearly to illustrate the invention.

While the invention is susceptible of various modifications and alternative constructions, I have shown in the drawings and will herein describe in detail the preferred embodiment with the understanding that the present description is to be considered as an exemplification of the principles of the invention and is not intended to limit the invention to the embodiment illustrated. The scope of the invention will be pointed out in the appended claims.

The machine selected to illustrate the invention is similar in many respects to the machine disclosed and claimed in my said copending application, Serial No. 696,517. The machine of this invention is equipped with an accumulator mechanism 21 (Fig. 2) of the general type disclosed in my prior Patent No. 1,357,748. The mechanism includes a register comprising a plurality of denominational numeral wheels 22 each with its associated carrying mechanism for carrying over the tens from a lower denominational to a higher denominational numeral wheel. The accumulator mechanism is operated through an actuating mechanism 23 hereinafter described in detail, such operation being effected through the medium of digital keys 24. One column of keys is provided for each denominational order of the accumulator mechanism, there being 9 of the keys 24 in each column numbered 1-9 beginning at the front of the machine. The numeral wheels 22 and other elements of the accumulator mechanism are mounted upon a frame 25 suppported to rock about the axis of the numeral wheels to engage and disengage the driving connection between the accumulator mechanisms and their associated actuating mechanisms. Zeroizing mechanism is adapted for operation by means of a hand lever 26 for swinging the frame 25 to the disengaged position in which the accumulator mechanism is cleared or "zeroized."

Figure 1:
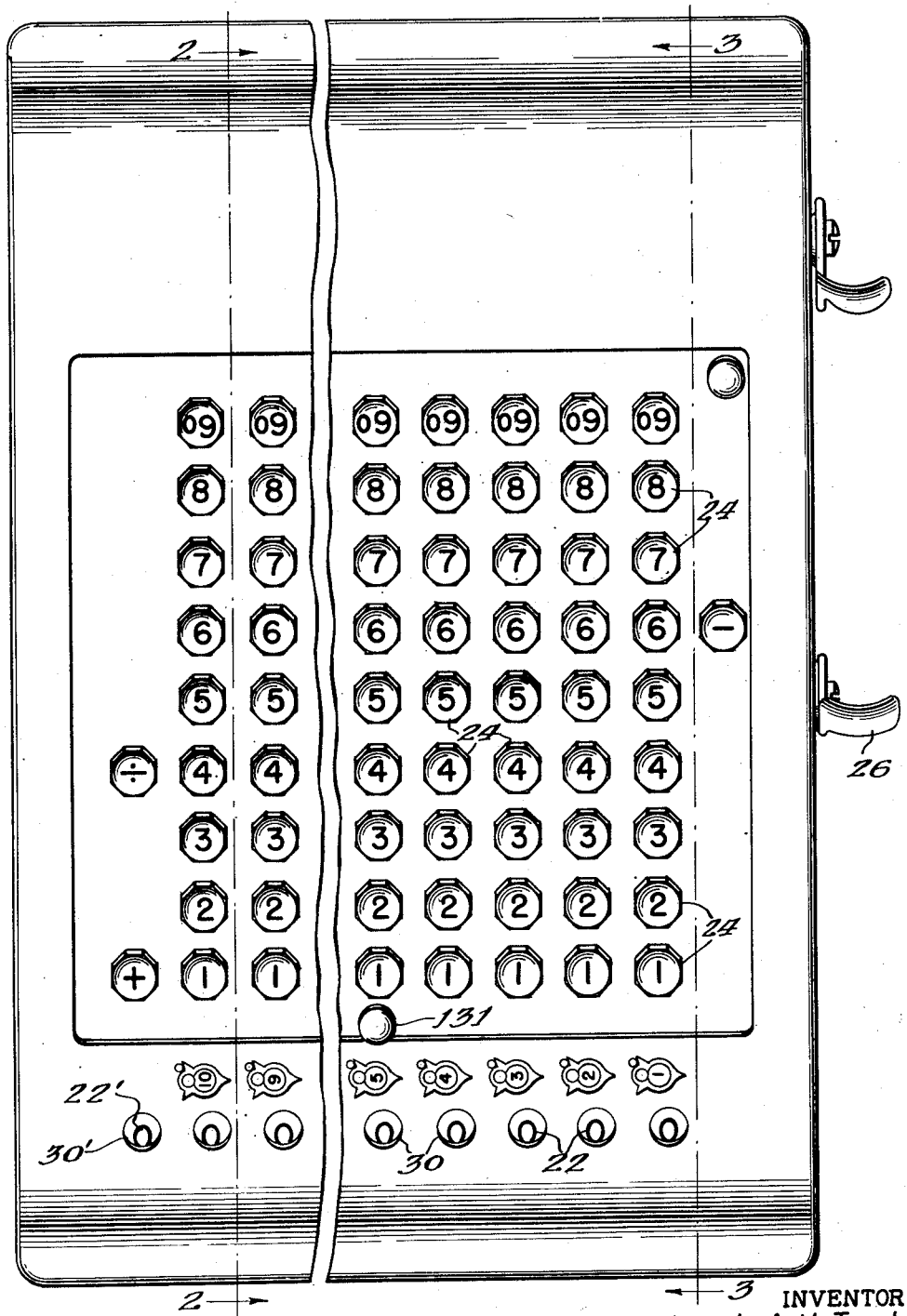
Fig. 1 is a plan view of a key-driven calculating machine embodying the features of the invention.

In the exemplary machine shown the keys 24 are mounted in a key frame 27 forming the top wall of a casing 28 within which the various mechanisms are supported by skeleton frame members or partitioned plates 29. Windows 30 in the top of the casing adjacent the front end thereof expose the numeral wheels to view. As shown in Fig. 1, an additional window 30' is provided to the left of the window for the highest denominational numeral wheel to accommodate an overflow numeral wheel 22'.

As herein shown, the key frame 27 is formed of generally rectangular plates, 31, 32, 33 and 34 suitably secured together and held in parallel spaced relationship by posts 35. Each of the keys 24 is provided with an elongated flat stem 36 adapted to extend through aligned slots in the frame plates for cooperation with the actuating mechanism 23. The keys are yieldably urged upwards by individual springs 37 mounted on lugs 38 struck up from the plate 33. The free ends of the springs engage in notches formed in the edges of the stems 36 so as to lie crosswise of the slots in the frame plates 32 and 33 and thus serve additionally to define the upper and lower limit positions of the keys.

Each key 24 when depressed serves to impart a predetermined degree of digital actuation to the accumulator mechanism as indicated by appropriate rotation of the numeral wheel 22 of the denominational order with which the depressed key is associated. Thus each row of keys is adapted to impart rotation to an accumulator actuating pinion 41 (Fig. 2) journalled on a cross shaft 42 that extends across the machine and is supported by the frame members 29. Rotation of the pinion 41 in one direction is transmitted through an internal ratcheted mechanism to a combined lantern wheel and accumulator gear 42' also journalled on the shaft 42. The lantern wheel gear is arranged to drive the associated numeral wheel 22 through the medium of a carrying gear and intermedian gear and a pinion, all of the gears being carried by the rock frame 25.

Carrying mechanism is provided in each denominational order of the accumulator mechanism for imparting a digital unit of actuation thereto each time that a tens transfer is to take place from a lower to a higher denominational order of the accumulator. This mechanism is shown and described in my prior Patent No. 1,357,748 to which reference may be had for a complete description of the construction and mode of operation.

In carrying out the invention the actuating mechanisms 23, by which the movements of the keys 24 are transmitted to the accumulator mechanisms, are constructed and arranged so that the operation of each key may be registered either as a positive value for use in addition or multiplication or a negative value for use in subtraction or division. More specifically, the actuating mechanisms are so constructed and arranged that they may be selectively set to transmit to the associated numeral wheel of the accumulator mechanism upon depression of a key a degree of movement sufficient to register either the numerical value of the key or in the units order, the complement of ten, and in other orders the complement of nine. Thus in each ordinal column of keys, except the first, the actuating mechanism may be set so that the depression of the "1" key will register either 1 or 8, the "2" key either 2 or 7, etc. In the first ordinal column of keys the selective setting of the actuating mechanism automatically conditions the "1" key to register either 1 or 9, the "2" key either 2 or 8, etc. Since negative values may be registered for subtraction or division by depressing the same keys used for registering positive values for addition, the keys may be designated by a single numeral. The "9" key in each denominational order carries the figures 9 and 0. In subtraction, of course, the 0's are not used. In division the 9's are not used but 0's appearing anywhere except at the end of the divisor are used. Inasmuch as in addition and multiplication the 0's are not used the keyboard so presented is in effect a uni-marked keyboard and materially simplifies the performance of negative calculations as but one keyboard marking need be memorized by the operator.

Figure 5:
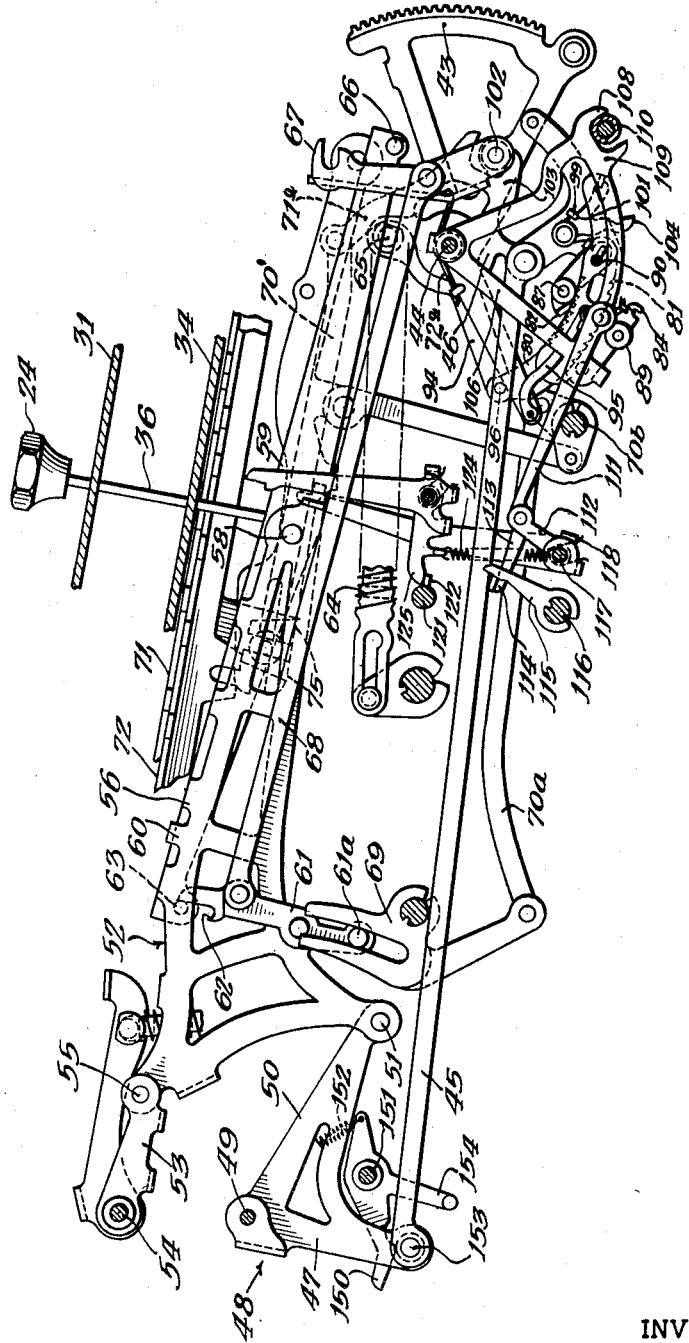
Fig. 5 is a side view of the ordinal actuating mechanism as viewed from the left hand side showing the mechanism set for additive or positive operation.
Figure 6:
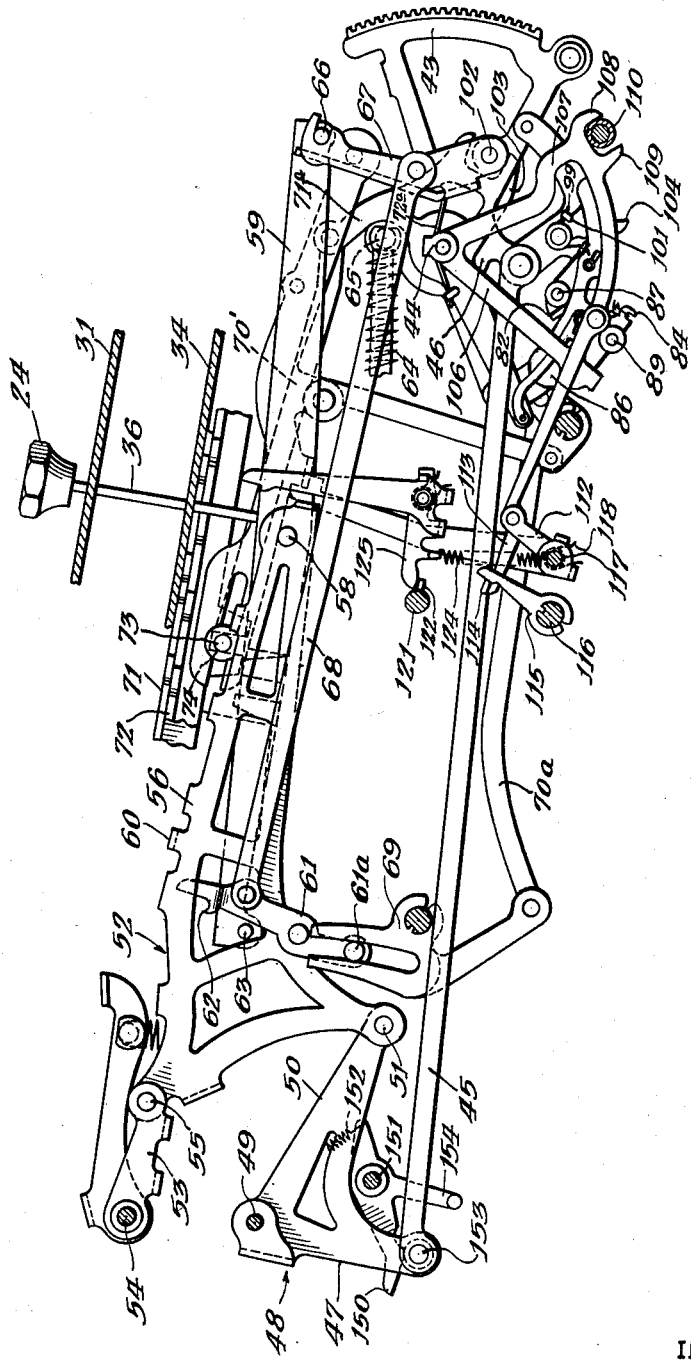
Fig. 6 is a view similar to Fig. 5 but showing the actuating mechanism set for a subtractive or negative operation.

As the actuating mechanisms 23 for the several denominational orders of the accumulator mechanism are alike a description of one will suffice. Referring to Figs. 2, 5 and 6 of the drawings, the actuating mechanism provided for each denominational order comprises a prime actuator in the form of a sector gear 43 supported upon a shaft 44 extending across the machine adjacent the front end thereof. The teeth of the sector gear mesh with the teeth of the actuating pinion 41 of the accumulator mechanism which, as explained before, is coupled with the lantern wheel 42' through the medium of a pawl and ratchet mechanism. A link 45 is secured at one end to a depending arm 46 rigid with the sector gear 43 and connects the sector to the shorter arm 47 of a link in the form of a bell crank member 48 fulcrumed to the frame through the medium of a rod 49 extending across the machine and supported in the frame plates. The longer arm 50 of the bell crank lever is pivotally connected at 51 to a second link in the form of a triangular member 52. The link member 52 is swingably fulcrumed to the frame through the medium of an arm 53 having one end pivoted at 54 to the frame and having its other end pivotally connected at 55 to one of the apices of the link member 52. The top side 56 of the link member 52 projects forwardly below the key frame 27 to a point substantially in alignment with the "5" key of the ordinal column of keys with which it is associated.

The link members 43 and 52 together with member 53 constitute a dual differential linkage system and provide for an improved and easier action of the keys used in adding the higher values. Furthermore, the link 50, being in the form of a bell crank lever, serves as a means of compounding the lever system for actuating the sector gears.

Pivotally supported at 58 adjacent the forward end of the side 56 is a balanced lever 59 extending longitudinally of the ordinal row of keys 24 and positioned for engagement by the lower end of the key stems of the keys from 1 to 5 upon depression of those keys. Keys 6 to 9 act directly on the side 56 of the link 52, although the key stems for keys 6 to 9 first contact the rear portion of the lever 59 prior to contacting the side 56 on their downward movement. Rocking of the lever 59 relative to the side 56 in a clockwise direction (as viewed in Fig. 2) is limited by a lug 60 projecting laterally from the upper edge of the side to overlie the rear end of the lever. Provision is made for selectively limiting the relative rocking movement of the lever in the opposite direction, such means including a locking dog 61 pivotally mounted on another side of the link member 52 so that its notched upper end 62 may be swung under a pin 63 projecting laterally from the lever adjacent its rear end. With the machine set for positive forms of calculation, the lever 59 constitutes in effect an extension of the side 56 so that the keys "1" and "9" when depressed impart a progressively increasing degree of movement to the link member 52. The notch 62 engages the pin 63 to prevent the front end of the lever 59 from flipping upward during action of the 6 to 9 keys during positive calculation and, as shown in Fig. 2 the upper end of the notched dog 61 is spaced from the pin 63 so as to permit a slight downward movement of the rear end of the lever 59, thus slightly increasing the range of movement of the keys "6" and "9" as compared to the movements of the lower numbered keys which engage the lever 59 forwardly of its pivotal point 58. In addition the mechanisms shown, including the two links 48 and 52, provide a more desirable distribution of the manual power required for actuation of the calculator and, incidentally, permit a desirable reduction in the size of the machine. Heretofore levers practically a foot long pivoted at the rear of the machine with springs to hold them suspended and connected by racks either fixed thereto or linked to sector gears have been used as prime movers of the denominational orders of key driven calculating machines. The application of the keys were ranged over about half the free end of the levers, leaving about half of the rear or fulcrumed end to be boxed up in the machine casing. With such an arrangement the "9" key of course required considerably more manual power to depress than the "1" key. In my hereinbefore mentioned patent application, Serial No. 696,517, I have disclosed how the same key leverage could be obtained in a much shorter space. By the use of the dual link mechanism disclosed in the present application I find that I can provide one-fifth extra movement over and above that of the old "9" key movement, which gives a much more desirable distribution of power for the higher numbered keys. To accomplish such an increase in movement by the old scheme of leverage would require lengthening the actuating lever to about 18 inches. To achieve that extra movement in the construction disclosed in my copending application Serial No. 696,517 it would be necessary to add about 6 inches to the length of the lever shown therein to obtain the same result. The differential compound lever arrangement shown gives a greater depth of action to the higher numbered keys in positive forms of calculation like addition and multiplication and likely increases the action of the "8" key, which adds the co-digital amount of 1 to the tens and higher orders and the complemental 2 to the units order. The action of the "1" key in all orders in either positive or negative calculations remains practically the same as in my said copending application.

When a key is depressed the motion imparted to the lever 59 and link 52 is transmitted through the link 48 to the sector gear 43 through the medium of the link 45. This motion rocks the sector gear downwardly or in a clockwise direction, as viewed in Fig. 2. Pinion 41, with which the sector gear meshes, is correspondingly rotated but no rotation is imparted to the lantern wheel 42' because of the ratchet connection provided between pinion and the wheel. Upon return movement of the sector gear the pinion and lantern wheel are rotated an amount determined by the displacement of the sector, thus registering on the numeral wheel 22 the value of the key depressed. Return of the sector is effected by a tension spring 64 connected to a stud 65 rigid with the sector. Thus actual operation of the accumulator mechanism is effected uniformly irrespective of the manner in which the keys are manipulated since the operation is effected through the medium of the power stored up in the spring 64 incident to the depression of the keys and takes place upon the release of the keys.

To permit registration of complemental values for negative calculations, such as subtraction and division, provision is made for changing the leverage ratio of the lever system through which the movements of certain of the keys are transmitted to the accumulator mechanism. More specifically, provision is made for shifting the fulcrum of the lever 59 so as substantially to reverse the extent of movement imparted to the lever system and sector 43 by the lower numbered keys. For this purpose the lever is provided at its forward end with a fulcrum stud 66 and a latching arm 67 is pivotally supported on the sector 43 so that it may be hooked over the stud or disengaged therefrom as required. A link 68 connects the latching arm 67 with the locking dog 61 so that when one of these fulcrum elements is shifted to its active position the other is simultaneously shifted to its inactive position.

With the latching arm 67 hooked over the stud 66, as shown in Fig. 6, the locking dog 61 is consequently rocked forwardly out of the path of the pin 63 at the opposite end of the lever 59. Depression of a key 24, accordingly, rocks the lever about the axis of the stud 66 and the lever through its pivotal connection 58 with the link member 52 rocks the latter about its swinging pivot. The action in this instance is substantially the reverse of that obtained when the locking dog 61 is engaged since the "1" key imparts maximum displacement to the linkage while the "9" key, as controlled by the stop bar mechanism hereinafter described, imparts minimum displacement thereto. As previously indicated, the arrangement is such that the complemental values of the keys in the units order and in the other orders are registered on the numeral wheels 22. Means are provided to shift the dog 61 and arm 67 upon conditioning the machine for positive or negative calculation. The means comprise a cam slotted arm 69 fixed upon a transordinal rock shaft 70 and engaging a dolly roll 61a in the lower portion of the dog 61. Rocking of the shaft 70 to shift the dog and arm is accomplished by depression of the proper key on the keyboard so marked as to indicate positive or negative calculation in the same manner as described in my said copending application, Serial No. 696,517, through the medium of the linkage 70a connecting the shaft 70 with a transordinal rock shaft 70b. This latter shaft is rocked upon the depression of a positive or negative key.

To insure accurate registration of the numerical values represented by the several keys 24 of each ordinal column means is provided for positively controlling the degree of actuation of the sector gear 43 upon depression of any key. This means, as herein shown, comprises a pair of stop bars 71 and 72 adapted to be coupled selectively with the gear sector 43 for positive and negative calculations respectively.

As more fully described in my said copending application, Serial No. 696,517, the stop bars comprise elongated sheet metal strips of angular cross-section supported below and at one side of the column of keys with one flange disposed substantially parallel to the key frame 27 and the other flange disposed in a vertical plane. As shown in the drawings, the stop bar 72 is located below and within the angle formed by the stop bar 71 and both are supported for endwise sliding movement by lugs struck out from the frame members 29.

Formed on the upper flange of each of the stop bars are a series of lugs projecting laterally for engagement with the stems 36 of the keys when the latter are depressed so as to limit the forward movement of the bars. The lugs of the stop bar 71 are spaced apart so that the movement of the bar increases progressively for the keys 1 to 9, the degree of movement in each instance being such that the numerical value of each key is registered accurately on the associated numeral wheel 22. The lugs on the stop bar 72 are correspondingly spaced apart but the relative location of the lugs is such that the complement of the numerical values of the keys are registered on the numeral wheels.

To enable the stop bars to perform their control functions provision is made for selectively coupling the bars to the gear sector 43. Such selective coupling is effected through the medium of a link 70' pivotally connected at one end to a control lever 71a rotatably mounted on the shaft 44 and resiliently connected to the sector gear 43 by means of a spring 72a for rotation therewith. The other end of the link 70' is provided with a laterally projecting stud 73 carrying a generally rectangular collar 74. The collar 74 is adapted to fit snugly between a pair of spaced fingers 75 rigid with the stop bar 71 or alternately between a pair of spaced fingers 76 rigid with the stop bar 72. The latter fingers are formed on and projected downwardly from the vertical flange of the stop bar 72 in laterally opposite relationship while the fingers 75 are bent up from the lower edge of a tab integral with and depending upon the vertical flange of the stop bar 71. Thus the fingers 75 and 76 are disposed in a common plane and as they are so located as to be in alignment when the stop bars are in their normal positions the collar 73 may be shifted vertically into engagement with either set of fingers to couple the associated stop bar to the gear sector 43 through the medium of the control lever 71a to place the sector under the control of the selected stop bar.

When the machine is set for positive calculation as shown in Fig. 5, the stop bar 71 is connected to the sector gear by the link 70'. Thus the permitted degree of adding movement imparted to the sector gear by the depression of any one key is determined by the stop bar 71. When the machine is set for negative calculation as shown in Fig. 6, the pin 73 is shifted upwardly to engage the bifurcated arms associated with the link 72 so that the degree of adding movement imparted to the sector gear is determined by the stop bar 72 when it contacts the stem of a depressed key. When the machine is set for negative calculation, the "1" key imparts nine degrees of adding movement to the sector gear and thus must rock the member 52 through a fairly substantial arc in order to move the sector gear through nine degrees of adding movement. Were it not for the compound lever system disclosed, the "1" key would have to be depressed through a far greater movement inasmuch as it is the key farthest removed from the pivotal point of the member 52. The lever system diclosed actually compounds the movement of the "1" key in order to rock the link 52 the required amount when the machine is set for negative calculation.

One of the principal features of the invention is the provision of an error control means adapted to co-act with the dual digital stop bars just described. An error control mechanism of the invention is provided for each ordinal column of keys, but inasmuch as all are similar in construction, only one will be described. The error control means consists of a ratchet sector 80 affixed to the sector gear 43. The ratchet sector is arcuate in shape and is provided along its lower edge with a series of ratchet teeth 81 with those teeth directed in such a manner as to co-act with a dog 84 to prevent return of the sector gear during the downstroke of a key. The ratchet is provided along its upper edge with a second series of ratchet teeth 83 so directed as to co-act with a dog 82 to prevent depression of a key should any key have failed to complete an upstroke. Means are provided to hold the upstroke dog 82 out of action during the downstroke action of a key and to hold the downstroke dog 84 out of action during the upstroke or return of a key. Thus there is no interference with any actuation except in the case of an incomplete key actuation. To this end means have been provided by which the downstroke dog 84 is allowed in engagement with the ratchet teeth 81 during a downstroke of the keys to prevent return of the actuating sector 43 in an adding movement if anything less than a full downstroke action should be made. If, however, the downstroke is complete the downstroke dog 84 will be lifted out of engagement with its ratchet teeth and by the same means the reverse or upstroke dog 82 is engaged with the upstroke ratchet teeth 83 compelling a full return of the sector and thus a complete return of a key before the keystroke may be reversed. The means employed to accomplish the shifting of down and up stroke ratcheting action consists of a sector guard plate 85 which is shiftedly mounted upon the ratchet sector 80 as to occupy either one of two positions, one in which its upper concave edge 86 contacts a dolly roll 87 on the upstroke dog 82 to hold it out of action with the ratchet teeth 83 during the downstroke of key action. The other position is such that the lower convex edge 88 is in contact with the dolly roll 89 and holds the downstroke dog 84 out of engagement with the downstroke ratchet teeth 81 during the upstroke of the key. The said two positions are attained through the medium of two studs 90 and 91 and biasing slots 92 and 93. Stud 90 is fixed to the ratchet sector 80 and engages the slot 92 in the guard plate. Stud 91 is fixed to the guard plate and engages slot 93 in the ratchet sector. The normal position of the guard plate 85 is such as will leave the downstroke ratchet dog 84 in action with the downstroke ratchet teeth 81.

To create motion coincident with the completion of every down keystroke to shift the guard plate 85 an arm 94 of the lock lever 71a is provided with a link 95 pivotally mounted upon a stud 96 affixed to the outer end of the arm. The other end of the link 95 is provided with a slot 97 which engages a stud 98 fixed to the guard plate 85. The guard plate 85 is normally held in the position shown relative to the ratchet sector by a spring 99, said spring also serving to supply spring action to the latch dog 100. The latch dog 100 serves to hold the guard plate 85 in its upstroke position by engagement with the lug 101 as the guard plate is shifted upon arm 94.

As any key is depressed the sector gear 43 is rotated clockwise (as seen in Fig. 7) through the medium of the link 45. The lock lever 71a rotates with the sector gear until its rotation is stopped by means of the link 70' which is connected to the particular stop bar which is in operation during the calculation. At this point the key is almost fully depressed, but not completely. It is still possible to depress the key further during which time the sector gear will rotate relative to the lock lever until a stud 102 fast on the sector gear contacts one arm 103 of the bifurcated portion of the lock lever. This motion of the sector gear relative to the lock lever causes the guard plate to ride in the studs and biasing slots previously described and to shift downwardly to contact the dolly roll 89 and lift the downstroke dog out of contact with the ratchet teeth 81. At the same time the upstroke dog 82 is shifted into engagement with the ratchet teeth 83. At the end of a complete upstroke an arm 104 on the latch dog 100 contacts a pin 105 to release the latch dog whereupon the action of the spring 99 will again throw the guard plate rearward and upward, moving the upstroke dog 82 out of contact with the ratchet teeth and re-engaging the downstroke dog 84.

From the foregoing description it should be evident that when either of the dual set of digital stop bars 71 or 72 contacts a key, a shifting action is given through the link 70' and lever 71a, causing the guard plate to shift to disengage the downstroke ratchet 84 and engage the upstroke ratchet 82. The action of the lock lever 71a takes place only during the last degree of action of the actuating sector 43.

The downstroke dog 84 is pivotally mounted upon an arm 106 of a triangular member 107 pivoted upon the shaft 44. Lugs 108 and 109 on the member 107 form a jaw which spans a frame spacer 110 allowing a short confined anticlockwise movement from the normal position shown in Fig. 2 until stopped by its lug 109 in the position shown in Fig. 7. Any key stroke short of a full downstroke will cause the ratchet dog 84 to be caught by a tooth of the downstroke ratchet 81 as the sector gear 43 seeks to return under the tension of its actuating spring 64 to rock the member 107 until its lug 108 engages the frame spacer as shown in Fig. 7. Pivoted to the member 107 is a link 111 extending rearward to a supporting arm 112 to which it is pivoted. The link 111 is provided with a free extension 113 having a bent lug 114 at its rear end. The lug 114 is adapted to hook over an arm 115 mounted on a transordinal rock shaft 116. The arm 112 is mounted on a pivot rod 117 and through the pressure of a torsion spring 118 provides a slight rearward pull on the link 111, which pull is enough normally to hold the member 107 in the normal position shown in Fig. 2. When a partial key downstroke takes place as shown in Fig. 7 the influence of the spring 118 is overcome by the stronger pull of the actuating spring 64, causing the lug 114 to rock the arm 115 and therefore cause the transordinal rock shaft 116 to be rocked clockwise as shown in Fig. 2 and anticlockwise as shown in Figs. 3 and 4 which disclose the mechanism as seen from the right hand side of the machine. It will be noted that a latch arm 119 affixed to the rock shaft 116 normally holds a catch 120 in the position disclosed in Fig. 4. When, however, the rock shaft 116 is rocked, as above described, by an incomplete key downstroke the latch arm 119 releases the catch 120 which is affixed to another transordinal rock shaft 121. This latter rock shaft is provided with a lug 122 in each denominational order and so placed as to co-act with a locking lever 123 in each order to hold them in the normal position disclosed in Fig. 2. When, however, the catch 120 is released springs 124 attached to lateral arms 125 of the locking levers 123 act to rock the ordinal shaft 121 by pressure against the lugs 122. This rotation of the shaft 121 by rotating the lugs 122 out of contact with the lateral arms 125 permits the springs 124 to rock the locking levers 123 to move them into a position in engagement with bent lugs 126 formed on the members 52 in all orders and thus lock all orders against key operation except the order in which the error was made. Inasmuch as the bent lugs 126 are in the position shown in Fig. 5 when an error is made, the locking lever 123 cannot engage therewith until the completion of a key stroke. Upon completion of a key stroke in the order in which the error was made that order becomes locked with all other orders.

When a partial key downstroke has been made and the key has been released the operator is immediately notified of the error as any attempt to depress the key in any other order is met with resistance. Further key strokes cannot be made until the error control mechanism has been cleared. To this end means are provided for clearing the error control mechanism by the depression of either of two keys 130 or 131. In addition, means are provided by which the zeroizing lever 26 performs a similar function. Error control buttons in the position of the key 130 have previously been employed on calculating machines. However, should an error occur in performing multiplication it is necessary for the operator to remove her fingers from the keys of the machine in order to reach the control key 130 should the operator's hands be in position near the forward part of the machine, that is, if the multiplier consists of the lower numbers. In such cases it has been the rule for the operator to clear the machine and start over again as it is very difficult to replace the fingers and recall the number of keystrokes previously made if the error occurs in the middle of the calculation. By providing the additional error control key 131 it is possible for the operator, after committing an error, to reach that key with the thumb of her left hand. Should the operator be multiplying with keys above the fives the little finger of the right hand can reach the key 130. Additional keys 131 may be provided across the front of the machine should the number of ordinal columns so require it. By so placing the error release keys it is possible for the operator to reach one of the keys with either the thumb of the left hand or the little finger of the right hand without removing her fingers from the keys, and thus after completing a partial keystroke the error control may be cleared and the calculation may then continue.

Error control key 131 is provided with a key stem 132 operating practically vertically through the key plate and contacting an arm 133 fixed upon a transordinal rock shaft 134 supported at each end by the frame plates and provided with a depending arm 135 fixed thereon as shown in Fig. 3. A grooved stud 136 is fixed in the lower end of the arm 135 in which is positioned the looped front end of a wire link 137. The rear end of the link is located in a grooved stud 138 secured to the catch 120. Depression of the error control key 131 rocks the arm 133 downwardly to rock the shaft 134 in an anti-clockwise direction, as seen in Fig. 2, and clockwise, as seen in Fig. 3, causing the wire link to be pulled forward by the arm 135. With this motion of the arm the wire link 137 swings the catch 120 in a clockwise direction, as seen in Fig. 4, to re-engage it with the latch 119. As the catch 120 is re-engaged the transordinal rock shaft 121 and its lugs 122 in each order lift the short arms 125 of the lock levers 123, clearing all of said lock levers from the lugs 126. This leaves the machine in its normal state free for the operator to continue the remaining keystrokes.

Referring now to the error control key 130 that key is provided with a stem 140 adapted to contact and rotate an arm 141 which is connected by a link 142 to an arm 143 fast on the catch 120. Thus it can be seen that depression of the key 130 produces the same result as depression of the key 131.

A link 145 connects the arm 141 with the zeroizing mechanism 146 so that with movement of the zeroizing lever 26 to clear the machine all error control mechanisms are simultaneously cleared. The zeroizing mechanism 146 is fully described in my said copending application, Serial No. 696,517, and need not be further described herein.

What I claim as new, and desire to secure by Letters Patent, is:

1. In a key-driven calculating machine having denominational orders of adding mechanism including a sector gear operated by the keys and spring actuated on its return adding stroke as the prime actuator in each order, error control means comprising: an arcuate ratchet sector secured to the sector gear and having a plurality of teeth along its upper and lower edges, a dog pivotally mounted on the machine and adapted to engage the teeth along one of said edges to prevent adding movement of the sector gear, a second dog pivotally mounted on the machine and adapted to engage the teeth along the other edge to prevent pre-adding movement of the sector gear, a shiftably mounted sector guard plate on the sector gear having arcuate upper and lower edges, means on each dog adapted to ride on an edge of the guard plate, means operating at the end of a complete key downstroke to shift the guard plate into lifting contact with the riding means on the first dog to disengage the dog and to engage the second dog, and means operating at the end of a complete key upstroke to shift the guard plate into lifting contact with the riding means on the second dog to disengage the dog and re-engage the first dog.

2. In a key-driven calculating machine having denominational orders of adding mechanism including a sector gear operated by the keys and spring actuated on its return adding stroke as the prime actuator in each order, error control means comprising: an arcuate ratchet sector secured to the sector gear and having a plurality of teeth along its upper and lower edges, a dog adapted to engage the teeth along one of said edges to prevent adding movement of the sector gear, a second dog adapted to engage the teeth along the other edge to prevent depression of a key, a shiftably mounted sector guard plate having arcuate upper and lower edges, a biasing slot in the guard plate, a stud fixed to the ratchet sector and engaging the slot, a dolly roll on each dog adapted to ride on an edge of the guard plate, means terminating the movement of the guard plate before completion of a key downstroke to cause the stud to travel in the slot to shift the guard plate into lifting contact with the dolly roll on the first dog to disengage the dog and to permit engagement of the second dog, and means operating at the end of a complete key downstroke to return the guard plate along the stud to shift the guard plate into lifting contact with the second dog to disengage the dog and re-engage the first dog.

3. In a key-driven calculator having denominational orders of adding mechanism including a sector gear operated by a lever operated by the keys and spring actuated on its return adding stroke and digital stop means for regulating the digital control of said adding mechanism, error control means comprising: a ratchet secured to the sector gear and having a first and a second plurality of teeth, a dog adapted to engage the teeth of the first plurality to prevent adding movement of the sector gear, a second dog adapted to engage the teeth of the second plurality to prevent depression of a key, a control lever mounted on the sector gear and resiliently fixed thereto for rotation therewith, a link connecting the control lever to the digital stop means and adapted to terminate rotation of the control lever immediately before completion of a key downstroke, a sector guard plate shiftably mounted on the sector gear and connected to the control lever, said guard plate having arcuate upper and lower edges, riding means on each dog adapted to ride on an edge of the guard plate, a biasing slot in the guard plate, a stud mounted in fixed relationship to the sector gear, said stud traveling in said slot in the final portion of key downstroke movement to shift the guard plate into lifting contact with the riding means on the first dog to disengage the dog and to permit engagement of the second dog, and means operating at the end of a complete key upstroke to shift the guard plate into lifting contact with the second dog to disengage the dog and re-engage the first dog.

4. In a key-driven calculator having denominational orders of key-driven adding mechanism including levers settable to give varying degrees of adding action to sector gears in each order from depression of the same keys, and dual stop means for regulating the digital control of the adding mechanism, error control means comprising: a ratchet secured to the sector gear and having a first and a second plurality of teeth, a dog adapted to engage the teeth of the first plurality to prevent adding movement of the sector gear, a second dog adapted to engage the teeth of the second plurality to prevent depression of a key, a control lever mounted on the sector gear and resiliently fixed thereto for rotation therewith, a link having one end connected to the control lever, means for connecting the other end of said link to either digital stop means, said link being adapted to terminate rotation of the control lever immediately before completion of a key downstroke, a sector guard plate shiftably mounted on the sector gear and connected to the control lever, said guard plate having arcuate upper and lower edges, riding means on each dog adapted to ride on an edge of the guard plate, a biasing slot in the guard plate, a stud mounted in fixed relationship to the sector gear, said stud traveling in said slot in the final portion of key downstroke movement to shift the guard plate into lifting contact with the riding means on the first dog to disengage the dog and to permit engagement of the second dog, and means operating at the end of a complete key upstroke to shift the guard plate into lifting contact with the second dog to disengage the dog and re-engage the first dog.

5. In a key-driven calculator having denominational orders of adding mechanism including a sector gear operated by a lever operated by the keys and spring actuated on its return adding stroke and digital stop means for regulating the digital control of said adding mechanism, error control means comprising: a ratchet secured to the sector gear and having a first and a second plurality of teeth, a dog adapted to engage the teeth of the first plurality to prevent adding movement of the sector gear, a second dog adapted to engage the teeth of the second plurality to prevent depression of a key, a control lever mounted on the sector gear and resiliently fixed thereto for rotation therewith, a link connecting the control lever to the digital stop means and adapted to terminate rotation of the control lever immediately before completion of a key downstroke, a stop arm on the control lever engageable with the sector gear to limit movement of the sector gear upon completion of a key downstroke, a sector guard plate shiftably mounted on the sector gear and connected to the control lever, said guard plate having arcuate upper and lower edges, riding means on each dog adapted to ride on an edge of the guard plate, a biasing slot in the guard plate, a stud mounted in fixed relationship to the sector gear, said stud traveling in said slot in the final portion of key downstroke movement to shift the guard plate into lifting contact with the riding means on the first dog to disengage the dog and to permit engagement of the second dog, and means operating at the end of a complete key upstroke to shift the guard plate into lifting contact with the second dog to disengage the dog and re-engage the first dog.

6. In a key-driven calculating machine having denominational orders of adding mechanism including a sector gear operated by a lever operated by the keys and spring actuated on its return adding stroke, error control means comprising: a ratchet secured to the sector gear and having a first and a second plurality of teeth, a dog pivotally mounted on the machine and adapted to engage the teeth of the first plurality to prevent adding movement of the sector gear, a second dog pivotally mounted on the machine and adapted to engage the teeth of the second plurality to prevent pre-adding movement of the sector gear, shiftable means mounted on the sector gear and operating at the end of a complete key downstroke to disengage the first dog and to engage the second dog and operating at the end of a complete upstroke to disengage the second dog and re-engage the first dog, a lock lever movable to a position locking the levers against movement, and means connected to the first dog and operating with release of a partially depressed key for moving the lock lever into locking position.

7. In a key-driven calculating machine having denominational orders of adding mechanism including a sector gear operated by a lever operated by the keys and spring actuated on its return adding stroke, error control means comprising: a ratchet secured to the sector gear and having a first and a second plurality of teeth, a dog pivotally mounted on the machine and adapted to engage the teeth of the first plurality to prevent adding movement of the sector gear, a second dog pivotally mounted on the machine and adapted to engage the teeth of the second plurality to prevent pre-adding movement of the sector gear, shiftable means mounted on the sector gear and operating at the end of a complete key downstroke to disengage the first dog and to engage the second dog and operating at the end of a complete upstroke to disengage the second dog and re-engage the first dog, a lock lever resiliently urged toward movement to a position locking the levers against movement, a lug engaging the lock lever to hold the same in unlocking position, and means connected to the first dog and operating under the tension of the sector gear spring with release of a partially depressed key for disengaging the lug.

8. In a key-driven calculating machine having denominational orders of adding mechanism including a sector gear operated by a lever operated by the keys and spring actuated on its return adding stroke, error control means comprising: a ratchet secured to the sector gear and having a first and a second plurality of teeth, a dog pivotally mounted on the machine and adapted to engage the teeth of the first plurality to prevent adding movement of the sector gear, a second dog pivotally mounted on the machine and adapted to engage the teeth of the second plurality to prevent pre-adding movement of sector gear, a sector guard plate shiftably mounted on the sector gear, means for shifting the sector guard plate at the end of a complete key downstroke to disengage the first dog and to engage the second dog and for shifting the sector guard plate at the end of a complete upstroke to disengage the second dog and re-engage the first dog, a lock lever resiliently urged toward movement to a position locking the levers against movement, a rotatable shaft carrying a lug engaging the lock lever, a catch connected to the shaft and adapted to hold the shaft against rotation with the lug holding the lock lever in unlocking position, means connected to the first dog and operating under the tension of the sector gear spring with release of a partially depressed key for disengaging the catch to lock the levers, and an error control clearing key for re-setting the catch to unlock the levers.

JOSEPH A. VALENTINE TURCK.

References Cited in the file of this patent

UNITED STATES PATENTS

| Number | Name | Date |
| --- | --- | --- |
| 1,538,447 | Petter | May 19, 1925 |
| 1,700,057 | Johnson | Jan. 22, 1929 |
| 1,905,579 | Turck | Apr. 25, 1933 |
| 1,927,856 | Turck | Sept. 26, 1933 |
| 2,224,203 | Turck | Dec. 10, 1940 |
| 2,356,714 | Webb | Aug. 22, 1944 |